United States Patent [19]

Stifelman

[11] Patent Number: 4,743,374
[45] Date of Patent: May 10, 1988

[54] HIGH-STRENGTH FILTER WITH IMPROVED FATIGUE RATING

[75] Inventor: Jack Stifelman, Bloomington, Minn.

[73] Assignee: Donaldson Company, Inc., Minneapolis, Minn.

[21] Appl. No.: 69,711

[22] Filed: Jul. 6, 1987

Related U.S. Application Data

[63] Continuation-in-part of Ser. No. 840,434, Mar. 14, 1986, abandoned.

[51] Int. Cl.[4] .............................................. B01D 27/08
[52] U.S. Cl. .................................. 210/440; 210/443; 210/DIG. 17
[58] Field of Search ............... 210/440, 443, 444, 450, 210/453, 454, DIG. 17; 29/163.5 F, 511

[56] References Cited

U.S. PATENT DOCUMENTS

| | | | |
|---|---|---|---|
| 1,851,938 | 3/1932 | Rieke | 29/511 |
| 2,098,102 | 11/1937 | McLean | 210/134 |
| 3,085,688 | 4/1963 | Eberle | 210/232 |
| 3,232,437 | 2/1966 | Hultgren | 210/DIG. 17 |
| 3,304,562 | 2/1967 | Schmidt | 29/511 |
| 3,557,963 | 1/1971 | Offer | 210/443 |
| 3,567,023 | 3/1971 | Buckman | 210/DIG. 17 |
| 3,625,363 | 12/1971 | Eberle | 210/130 |
| 3,677,412 | 7/1972 | Connor | 210/440 |
| 3,685,658 | 8/1972 | Baldwin | 210/440 |
| 3,719,281 | 3/1973 | Dieringer | 210/440 |
| 3,875,651 | 4/1975 | La Croce | 29/511 |
| 4,045,349 | 8/1977 | Humbert, Jr. | 210/232 |
| 4,168,237 | 9/1979 | Pickett et al. | 210/440 |
| 4,241,491 | 12/1980 | Hopp | 29/511 |
| 4,369,113 | 1/1983 | Stifelman | 210/440 |
| 4,378,174 | 3/1983 | Hesse | 29/511 |
| 4,510,660 | 4/1985 | Hoeffken | 29/511 |

FOREIGN PATENT DOCUMENTS

| | | | |
|---|---|---|---|
| 2456428 | 12/1976 | Fed. Rep. of Germany | 210/440 |
| 2226199 | 11/1974 | France | 210/440 |
| 2327812 | 5/1977 | France | 210/440 |
| 1254274 | 11/1971 | United Kingdom | 210/440 |
| 2100140A | 12/1982 | United Kingdom | 210/440 |

Primary Examiner—Ernest G. Therkorn
Attorney, Agent, or Firm—Merchant, Gould, Smith, Edell, Welter & Schmidt

[57] ABSTRACT

A high-strength spin-on filter (10) of improved fatigue strength comprises a cylindrical housing (12), a unitary cover (28) and an internal filter element assembly (18). The open end of the housing (12) is folded inwardly over the periphery of the cover (28) and into deformable engagement with radial projections (54) thereon to secure the cover and housing against both relative rotation and separation without stress concentrations that would otherwise decrease fatigue life of the filter (10) in high-pressure pulsatile hydraulic systems.

10 Claims, 3 Drawing Sheets

HIGH-STRENGTH FILTER WITH IMPROVED FATIGUE RATING

CROSS REFERENCE TO RELATED APPLICATION

This is a continuation-in-part of co-pending application Ser. No. 840,434, filed Mar. 14, 1986, now abandoned.

TECHNICAL FIELD

The present invention relates generally to fluid filters of the spin-on type. More particularly, this invention concerns a reinforced spin-on filter incorporating a rigid, unitary cover which is connected to the housing by means of an inwardly folded lip that engages ribs on the end of the cover to secure the cover and housing against both separation and rotation in a manner which improves fatigue strength.

BACKGROUND ART

Spin-on filters have been employed heretofore in a variety of applications including hydraulic systems and engine lubrication systems. Such filters generally include a filter element within a can or housing having a cover or attachment plate at one end thereof by which the filter can be screwed onto or off of a filter head. A central opening and several surrounding openings in the cover direct fluid flow through the filter, which flow can be in either an inside/out or outside/in direction relative to the filter element. A circular gasket on the outside of the cover serves as the external seal between the filter and the filter head, while another circular gasket on the inside of the cover functions as the internal seal between the filter element and cover. A spring is often provided in the lower end of the housing to maintain the filter element in sealing engagement with the cover. Spin-on filters are usually intended to be used only once before removal and replacement.

Although satisfactory in low- and medium-pressure applications, most spin-on filters of the prior art have not been particularly suitable for use in high-pressure applications, such as in hydraulic transmission pumps, where spikes or surges up to about 1,000 psi can occur. Many of the spin-on filters currently available are adaptations of the type used in engine lubrication systems. The covers of such spin-on filters are typically constructed of a stamped steel-based disc and a relatively thinner secondary disc spot welded thereto. The base disc includes an extruded, relatively shallow, internally threaded neck portion by which the filter can be connected to a filter head. Flow openings are punched into the base disc around the neck portion. The lip at the open end of the housing is connected by means of a lock seam to the periphery of the secondary disc, which is also formed to serve as a seat for the external gasket. In spin-on filters of this type, any fatigue failure is most likely to occur at the rolled lock seam or at the spot welds. Any burst failure is most likely to occur either upon bending of the cover, which allows leakage past the external gasket, or upon unfolding of the rolled lock seam. The prior spin-on filters of this type have thus been susceptible to failure at the cover and/or at the connection between the cover and the housing.

Various attempts have been made to strengthen and otherwise increase the pressure capacities of the prior spin-on filters. Different materials and/or increased material thicknesses have been used, improved lock seams have been developed, and reinforcing profiles have been formed into the cover plates. These efforts have resulted in increasing the burst capacities of such spin-on filters up to about 500 psi, and have therefore been of some success; however, even filters of such capacity can be marginal in certain applications. In addition, reinforcing efforts of this type tend to increase the cost of such filters. It will be understood that manufacturing limitations and production economies can be important factors in the construction of such spin-on filters.

More recently, U.S. Pat. No. 4,369,113 issued to Donaldson Company, Inc., for an improved high-strength spin-on filter which overcomes many of the disadvantages of the prior art. This spin-on filter is capable of withstanding pressure surges and spikes up to about 1,000 psi or more, and has met with considerable commercial success. While suitable for use in many high-pressure applications, however, it has been found that fatigue strength can be just as important as pressure capacity in certain applications, such as hydrostatic transmissions and charge pump circuits, involving cyclical operational loads.

There is thus a need for an improved reinforced spin-on filter of high pressure capacity and better fatigue rating.

SUMMARY OF INVENTION

The present invention comprises an improved high-strength spin-on filter which overcomes the foregoing and other difficulties associated with the prior art. In accordance with invention, which is an improvement over the filter shown in U.S. Pat. No. 4,369,113, there is provided a high-strength spin-on filter comprising a generally cylindrical filter housing having open and closed ends. A generally cylindrical filter element is disposed within the housing. A cover is secured to the open end of the housing. The cover, which is preferably is of one-piece integral construction, includes a central hub and a plurality of radial ribs interconnecting the hub and a circular rim. The cover also includes flow openings that terminate on opposite sides of the filter element inside the housing. Gasket seats are formed in the outer end and the side surface of the rim of the cover. The open end of the housing is folded inwardly over the rim of the cover in a manner which approximates the effect of a flat bottom in a pressure vessel, whereby stresses are reacted in shear rather than bending. In particular, a plurality of radial teeth are provided about the outer end of the cover in a circular groove therein for direct engagement with the folded connection so as to constrain the cover and housing against both separation and rotation while avoiding points of stress concentration that would otherwise be susceptible to fatigue during use in high-pressure charging circuits and the like.

BRIEF DESCRIPTION OF DRAWING

A better understanding of the invention can be had by reference to the following Detailed Description in conjunction with the accompanying Drawing, wherein.

DETAILED DESCRIPTION

Figure 1:
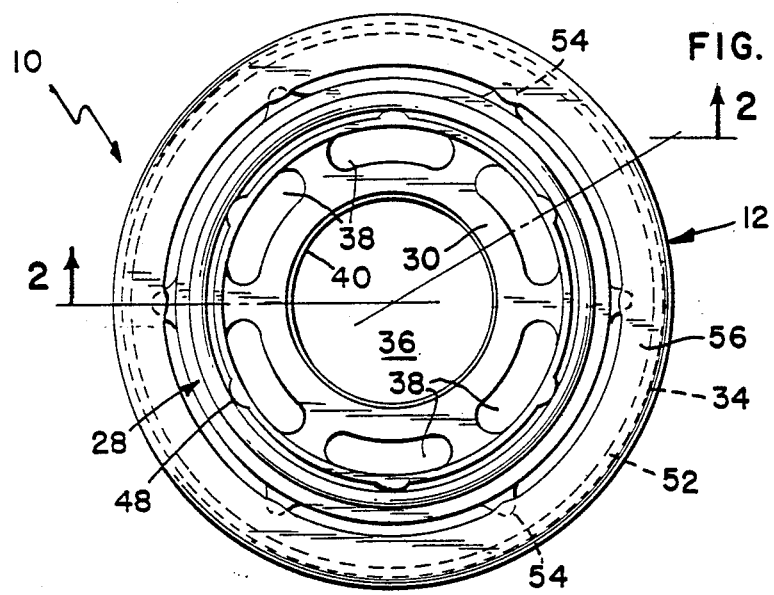
FIG. 1 is a top view of a spin-on fluid filter incorporating a first embodiment of the invention.
Figure 2:
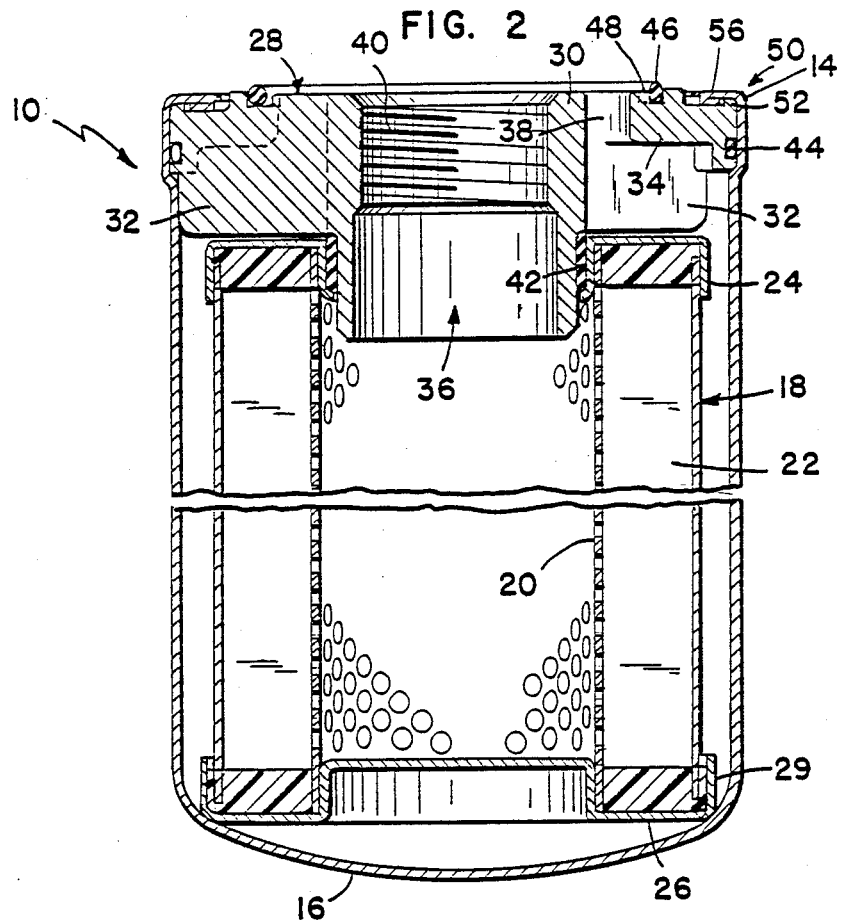
FIG. 2 is an enlarged axial section view taken along lines 2—2 of FIG. 1 in the direction of the arrows.
Figure 5:
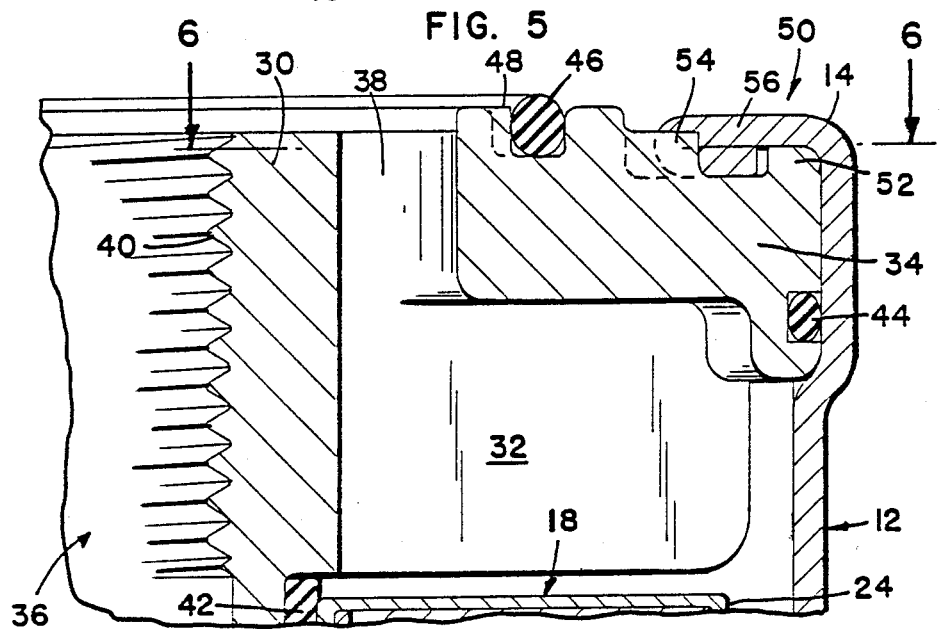
FIG. 5 is an enlarged view of a portion of the spin-on fluid filter shown in FIG. 2.
Figure 7:
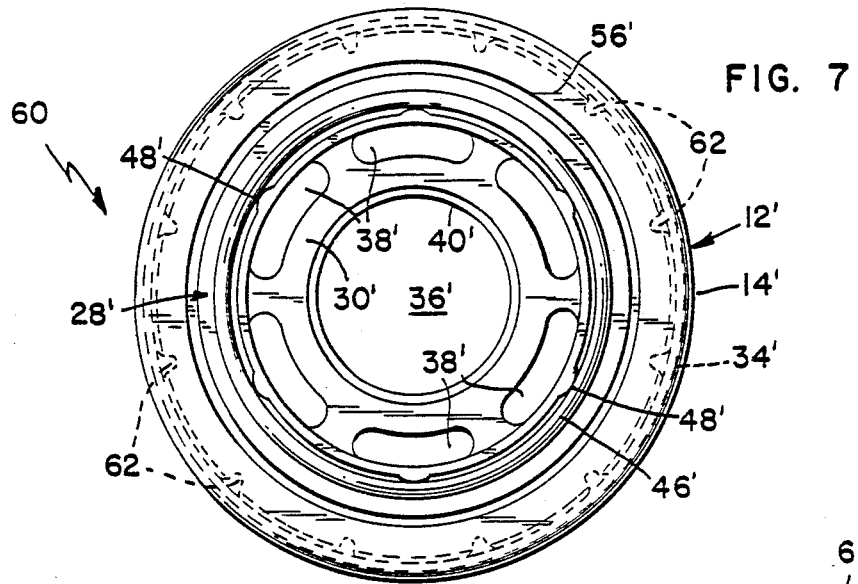
FIG. 7 is a top view of a spin-on filter incorporating a second embodiment of the invention.
Figures 8, 9:
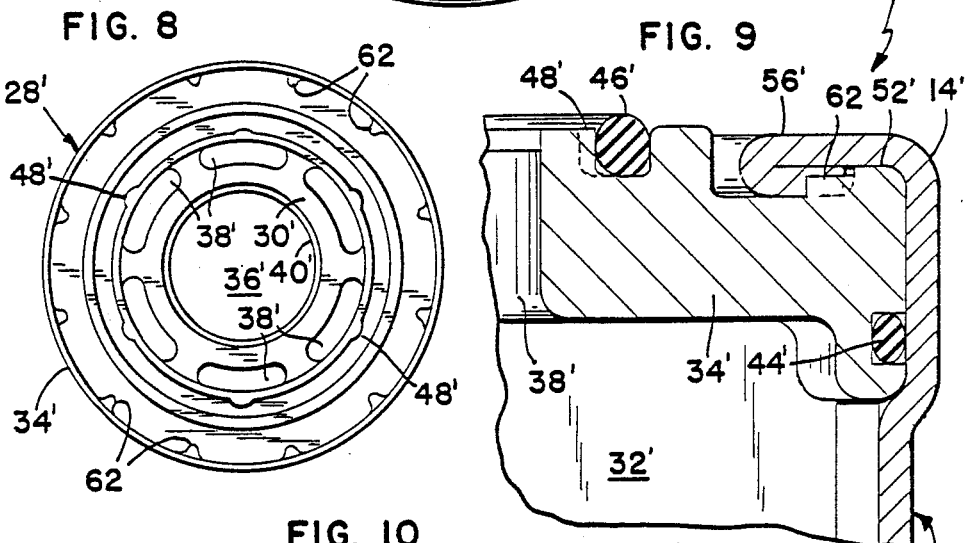
FIG. 8 is a top view of the cover of the filter shown in FIG. 7.
FIG. 9 is an enlarged partial axial section view taken generally along lines 9—9 of FIG. 7 in the direction of the arrows.
Figure 10:
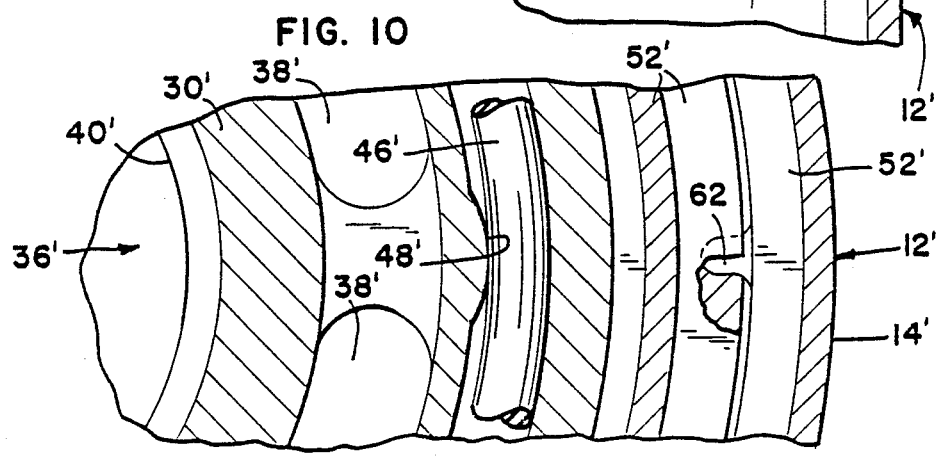
FIG. 10 is an enlarged partial cross-sectional view taken generally along lines 10—10 of FIG. 9 in the direction of the arrows showing the details of the cover/housing connection of the second embodiment.

Referring now to the Drawing, wherein like reference numerals designate like or corresponding elements throughout the views, and particularly referring to FIGS. 1 and 2, there is shown a spin-on fluid filter 10 incorporating a first embodiment of the invention. As will be explained more fully hereinafter, the filter 10 is particularly adapted for filtration of oil in hydrostatic transmissions and other systems characterized by cyclical high-pressure loads.

The filter 10 incorporates several components which are substantially similar to the filter shown in my prior U.S. Pat. No. 4,369,113. For example, filter 10 includes a generally cylindrical filter housing 12 having an open top end 14 and a closed bottom end 16. The housing 12 is a generally thin-walled construction, and is typically formed by stamping or drawing from metal such as steel or other suitable material. For example, housing 12 can be formed from deep drawn steel of about 0.040-inch wall thickness.

A filter element assembly 18 is positioned inside the filter chamber defined by housing 12. The filter element assembly 18 includes a perforated core 20 surrounded by a filter element 22, both of which are generally cylindrical and supported between a pair end pieces 24 and 26. The bottom end piece 26 extends across and closes the bottom end of the perforated core 20, which can be paper or other suitable media, while the upper end piece 24 includes a central opening for receiving a portion of a cover 28 secured within the open end 14 of the housing 12. The filter element 22 can be potted in place or otherwise secured between the end pieces 24 and 26 as shown. Standoff-spacers 29 are provided about the bottom end piece 26 for pressure equalization. The spacers 29, three of which can be utilized at equal circumferentially spaced intervals, are preferably formed integral with bottom end piece 26.

The cover 28 includes a central hub 30 which is interconnected by a plurality of radial webs or ribs 32 with a circular outer rim 34. As illustrated, cover 28 includes six ribs 32 at equally spaced intervals, although the precise number of ribs and spacing therebetween are not critical to practice of the invention. The hub 30 defines an axial opening 36 extending through cover 28. Openings 38 are also defined in the cover 28 between hub 30, ribs 32 and rim 34. The openings 36 and 38 serve as flow ports whereby fluid to be filtered is circulated through filter 10 in either an inside/out or outside/in flow direction through the filter element assembly 18. Threads 40 are provided on the upper inside surface of the hub 30 for connecting the filter 10 to a filter head (not shown). The cover 20 is preferably formed by casting or the like from metal, such as aluminum, or other suitable material, into a rigid integral unit.

Figures 3, 4:
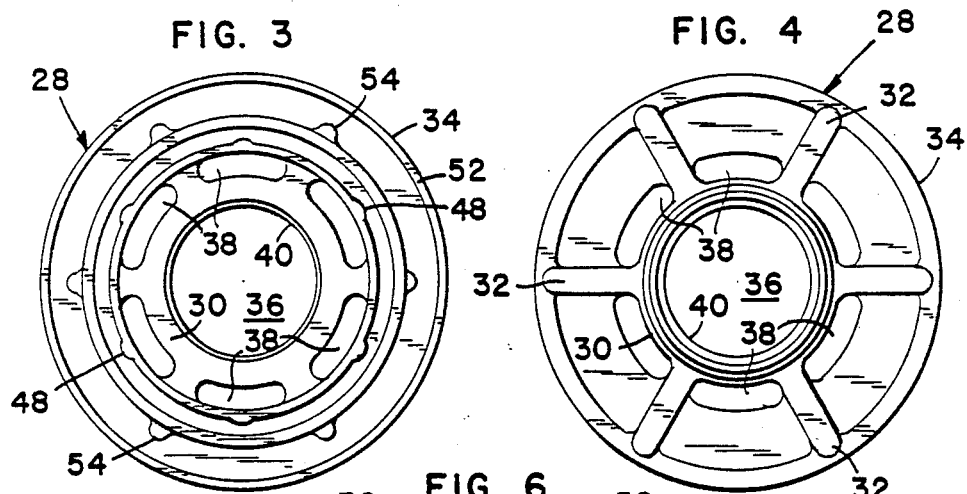
FIGS. 3 and 4 are top and bottom views, respectively, of the cover of the spin-on fluid filter of the invention.
Figure 6:
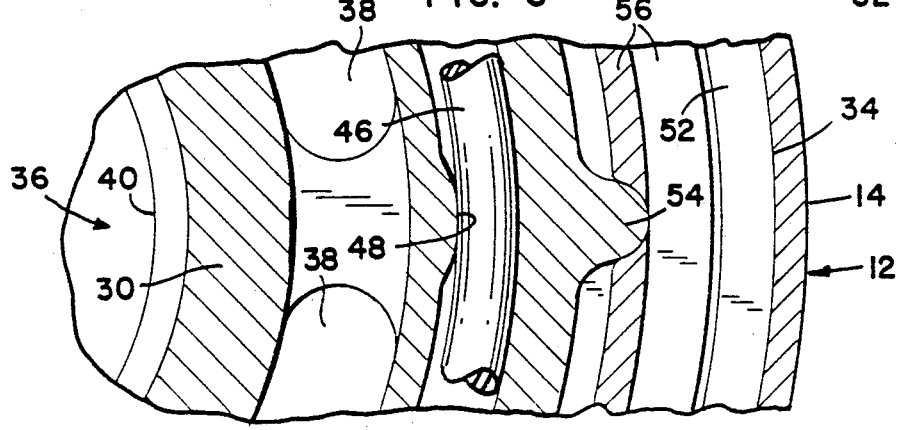
FIG. 6 is a cross-sectional view taken along 6—6 of FIG. 5 in the direction of the arrows showing the details of the cover/housing connection of the first embodiment.

Three seals are provided on the cover 28. A seal 42 is located on the inner end of the cover 28 between the hub 30 and the upper end of the filter assembly 18. Another seal 44 is located in a circumferential groove formed around the rim 34 between cover 28 and the upper end 14 of the housing 12. Yet another seal 46 is located in a groove on the outer end of the cover 28 surrounding openings 36 and 38 for external sealing purposes between the filter 10 and the filter head (not shown). The groove within seal 46 is seated preferably includes a plurality of radial projections 48, which are best seen in FIGS. 2 and 3, for releasably retaining the seal in place during handling of the filter 10.

The cover 28 and housing 12 are secured together by a folded connection 50. In particular, cover 28 includes a peripheral lip 52 defining a groove in the outer end of the rim 34 surrounding the inner groove containing the O ring seal 46. A plurality of circumferentially spaced-apart, outwardly extending radial projections 54 are provided in the outer groove opposite lip 52. As illustrated, six projections 54 at equally spaced intervals have been used, although any suitable number can be utilized. The upper end 14 of housing 12 surrounds the rim 34 and extends inwardly over the lip 48, with the terminus of the upper end being folded inwardly and underneath itself in deforming engagement over projections 54 and behind the lip. A spinning operation is preferably utilized to accomplish folding.

This particular connection between housing 12 and cover 28 comprises a critical feature of the present invention. Use of the folded connection 50 approaches the effect of a flatbottom pressure vessel, resulting in greater resistance to unrolling and straightening so that the stress is reacted more in shear than in bending whereby a higher pressure capacity can be achieved. As the folded connection 50 is formed, the folded terminus of the end 14 of housing 12 deforms over projections 54 so that the resultant folded connection serves to secure the housing 12 and cover 28 together against rotation as well as separation. The folded connection 50 thus serves two purposes and eliminates the need for extended ribs and corresponding indentations in the side of the housing, as in my prior filter, which secure the housing and cover against rotation, but which can also become areas of stress concentration that would otherwise be susceptible to fatigue failure in pulsating high-pressure hydraulic circuits. Preliminary test results have confirmed that this construction improves the fatigue life of the filter 10 about four to ten times over that of my prior filter.

For example, direct comparison tests have been conducted between the improved filter herein and its predecessor shown in U.S. Pat. No. 4,369,113. The filters were of identical size and construction, except for the side versus end cover/housing interlock feature. The covers of both filters were of cast aluminum, and their housings were of 0.048 inch deep drawn mild steel. Both filters were subjected to cyclic pressure loads of 0 to 400 psi at 2 hertz or two times per second, under both sine wave and square wave loads.

Under sine wave loads, the old filter failed after an average of 124,300 cycles, whereas the new filter failed after an average of 1,233,900 cycles, for an increased fatique life ratio or factor of about 9.9.

Under square wave loads, the old filter failed after an average of 165,900 cycles, whereas the new filter failed after an average of 566,800 cycles, for an increased fatigue life factor of about 3.4.

The overall average increased fatigue life factor of the new filter over the old filter for both sine and square wave loads during these tests was about 5.5.

As for failure mode, the old filter failed when the housing cracked at the side rib/detent interlocks which, as explained above, are areas of stress concentration. The new filter failed when the cover cracked or when the housing cracked at its closed or "dome" end, confirming the structural superiority of the new filter.

FIGS. 7-10 illustrate an improved spin-on fluid filter 60 incorporating a second embodiment of the invention. The filter 60 utilizes several components which are substantially identical in construction and function to components of the filter 10 herein. Such components have been identified with the same reference numerals utilized hereinbefore in conjunction with the description of filter 10, but have been differentiated therefrom by means of prime (') notations.

The primary distinction between the spin-on filters of the two embodiments herein resides in the fact that filter 60 includes a plurality of inwardly extending radial projections 62 for interlock with the folded connection 50', instead of outwardly extending radial projections 54 of filter 10. As illustrated, the filter 60 includes twelve projections 62 at equally spaced intervals, although any suitable number can be utilized. The projections 62 are relatively smaller and more numerous than projections 54, but function in the same manner so that the folded connection 50' of the filter 60 interlocks the housing 12' and cover 28' against both rotation and separation. In all other respects, the filter 60 is structurally and functionally similar to filter 10.

From the foregoing, it will thus be apparent that the present invention comprises an improved high-strength spin-on filter having several advantages over the prior art. Improved fatigue strength without additional parts, manufacturing steps and increased cost are but some of the advantages. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. In a fluid filter including a filter element inside a housing closed at one end by a cover with inlet and outlet openings therein and inner and outer grooves in the outer end thereof, the open end of the housing being folded inwardly over the periphery of the cover in a predetermined fold to secure the cover and housing against separation, the improvement comprising:
    the circumferential periphery of said cover being smooth and free of radial projections; and
    a plurality of circumferentially spaced-apart radial projections formed into the outer end of said cover, the inwardly folded end of said housing being deformably engaged with said projections to secure said cover and housing against rotation.

2. The fluid filter of claim 1, wherein said projections extend radially outward and are formed in the inner wall of a circular groove provided in said cover for receiving the folded end of said housing.

3. The filter of claim 1, wherein said projections extend radially inward and are formed in the outer wall of a circular groove provided in said cover for receiving the folded end of said housing.

4. The filter of claim 1, wherein the upper end of said housing is folded inwardly in generally P-shaped cross-sectional configuration.

5. A spin-on fluid filter of improved burst and fatigue strength, which comprises:
    a generally cylindrical housing having an open end and a closed end;
    a generally cylindrical filter element disposed within said housing, said filter element having an open end and a closed end;
    a rigid unitary cover disposed in the open end of said housing, said cover having an outer end and an inner end;
    said cover including a hub extending substantially into said housing to define a central first flow opening, a surrounding circular rim, and a plurality of radial ribs interconnecting the hub and rim to define offset second flow openings;
    the outer end of said cover including inner and outer circular grooves in the rim surrounding the second flow openings, with the outer groove including a plurality of circumferentially spaced-apart radial projections therein;
    the open end of said housing surrounding and being folded inwardly over the periphery of the rim into a predetermined fold deformably engaging said projections in the outer groove in the outer end of said cover to secure said cover and housing against both separation and rotation;
    the circumferential periphery of the rim of said cover being smooth and free of radial projections;
    a first seal engaged between said cover and housing;
    a second seal engaged between the open end of said filter element and the inner end of said cover;
    a third seal disposed in the inner groove in the outer end of said cover; and
    means on said cover for removably mounting the filter.

6. The spin-on fluid filter of claim 5 wherein said radial projections extend outwardly and are formed in an inner wall of the outer groove in the outer end of said cover.

7. The spin-on fluid filter of claim 5 wherein said radial projections extend inwardly and are formed in an outer wall of the outer groove in the outer end of said cover.

8. The spin-on fluid filter of claim 5, wherein said mounting means comprises internal screw threads formed on the hub of said cover.

9. The spin-on fluid filter of claim 5, further including:
    spacers disposed between the closed end of said filter element and said housing for facilitating pressure equalization across said filter element.

10. A spin-on fluid filter of improved burst and fatigue strength, which comprises:
    a generally cylindrical housing having opposite open and closed ends;
    a generally cylindrical filter element disposed within said housing, said filter element having opposite open and closed ends;

a rigid unitary cover disposed in the open end of said housing, said cover having opposite open and closed ends;

said cover including a hub extending substantially into said housing to define a central first flow opening, a surrounding circular rim, and a plurality of radial ribs interconnecting the hub and rim to define offset second flow openings;

the outer end of said cover including inner and outer circular grooves in the rim surrounding the second flow openings, with the outer groove including a plurality of circumferentially spaced-apart radial projections therein;

the open end of said housing surrounding and being folded inwardly over the periphery of the rim into an interlocking fold of generally P-shaped cross-section deformably engaging said projections in the outer groove in the outer end of said cover to secure said cover and housing against both separation and rotation;

the circumferential periphery of the rim of said cover being smooth and free of radial projections;

a first seal engaged between said cover and housing;

a second seal engaged between the open end of said filter element and the inner end of said cover;

a third seal disposed in the inner groove in the outer end of said cover; and means on said cover for removably mounting the filter.

* * * * *